United States Patent [19]

Shimizu

[11] Patent Number: 5,608,964
[45] Date of Patent: Mar. 11, 1997

[54] METHOD FOR PRODUCING A THIN FILM MAGNETIC HEAD HAVING AN IMPROVED COIL CONDUCTOR LAYER

[75] Inventor: Osamu Shimizu, Minami-ashigara, Japan

[73] Assignee: Fuji Photo Film Co., Ltd., Kanagawa, Japan

[21] Appl. No.: 654,043

[22] Filed: May 28, 1996

Related U.S. Application Data

[63] Continuation of Ser. No. 262,520, Jun. 20, 1994, abandoned, which is a continuation of Ser. No. 780,937, Oct. 23, 1991, Pat. No. 5,369,539.

[30] Foreign Application Priority Data

Oct. 25, 1990 [JP] Japan ................................. 2-285925

[51] Int. Cl.$^6$ ........................................................ G11B 5/42
[52] U.S. Cl. ........................ 29/603.14; 360/123; 360/126; 427/131; 427/132; 29/603.25
[58] Field of Search ........................... 29/603.13, 603.14; 360/123, 126; 427/131, 132; 21/603.15, 603.25

[56] References Cited

U.S. PATENT DOCUMENTS

| | | |
|---|---|---|
| 4,622,613 | 11/1986 | Nomura et al. . |
| 4,774,755 | 10/1988 | Yoshisato et al. . |
| 4,860,140 | 8/1989 | Momata et al. . |
| 5,004,520 | 4/1991 | Tsuji et al. . |
| 5,059,278 | 10/1991 | Cohen et al. . |

FOREIGN PATENT DOCUMENTS 464107  3/1989  Japan .

*Primary Examiner*—Carl E. Hall
*Attorney, Agent, or Firm*—Sughrue, Mion, Zinn, Macpeak & Seas

[57] ABSTRACT

A thin film magnetic head in which at least a magnetic layer, a conductor layer constituting a coil and an insulating layer (or layers) are formed and patterned to a predetermined shape on a substrate, wherein the conductor layer is formed of a Cu—Ag alloy of $Cu_{100-x}Ag_x$ where $0.1 \leq x \leq 10$ in atomic percent. The gap surface has a surface irregularity level not exceeding 350 Angstroms at Rmax and the conductor layer has a resistivity of 2 μΩcm or less even after heat treatment at 450° to 550° C.

5 Claims, 4 Drawing Sheets

METHOD FOR PRODUCING A THIN FILM MAGNETIC HEAD HAVING AN IMPROVED COIL CONDUCTOR LAYER

This is a Continuation of application Ser. No. 08/262,520 filed Jun. 20, 1994, now abandoned, which is a Continuation of application Ser. No. 07/780,937 filed Oct. 23, 1991, now U.S. Pat. No. 5,369,539.

FIELD OF THE INVENTION

This invention relates to a thin film magnetic head employed in a magnetic disc, magnetic tape or floppy disc apparatus. More particularly, it relates to an improved conductor layer employed in the thin film magnetic head.

RELATED ART

Heretofore, a conductor layer of Cu has been employed in a coil of a thin film magnetic head having a plurality of superimposed layers.

On the other hand, JP Patent KOKAI Publication No. 1-64107 (1989) contains a description to the effect that a Ti layer is formed by sputtering between the conductor layer and an insulating layer at a substrate temperature of not lower than 100° C.

PROBLEM TO BE SOLVED BY THE INVENTION

However, the Cu layer has a drawback that, when it is patterned to a coil shape by photolithography and ion milling, surface irregularities are produced on the coil conductor surface during ion milling, which irregularities ultimately produce surface irregularities on the gap surface to deteriorate electro-magnetic conversion characteristics of the magnetic head. For obviating such drawback, it has heretofore been necessary to eliminate these surface irregularities by highly selective ion etching employing a reactive gas during formation of the gap surface.

However, the above method relying on the reactive ion etching not only complicates the process but presents environmental problems because the gas used therein is generally flon type gas, which is a fluorine substitution product of, for example, methane or ethane, additionally containing chlorine.

On the other hand, it is possible with the above described method according to JP Patent KOKAI Publication No. 1-84107 (1989) to diminish the above mentioned surface irregularities by providing a Ti layer between the conductor layer and the insulating layer by sputtering or the like.

However, with this method, since the Ti layer and the Cu layer border on each other, Ti is reacted with Cu to raise the electrical resistance significantly if the temperature is raised to not lower than 450° C. after formation of the conductor layer. For this reason, the overall process temperature has to be set to at least not higher than about 450° C. Thus a magnetic layer, which should produce superior properties by heat treatment at higher temperatures, cannot be used at least as an upper magnetic layer.

SUMMARY OF THE DISCLOSURE

In view of the above described status of the art, it is an object of the present invention to provide a thin film magnetic head with which a flat gap surface may be formed without employing reactive gases and which has excellent electro-magnetic properties capable of withstanding a processing at elevated temperatures.

According to the present invention, the above object may be accomplished by a thin film magnetic head in which at least a magnetic layer, a conductor layer constituting a coil and an insulating layer (or layers) are formed and patterned to a predetermined shape on a substrate, wherein the conductor layer consists essentially of a Cu—Ag alloy.

Preferably, the conductor layer has a compositional formula of

where $$0.1 \leq x \leq 10$$

in terms of atomic percent.

As the amount of Ag in the conductor layer becomes smaller than 0.1 atomic percent, the surface irregularities on the gap surface become increasingly larger. With the amount of Ag in the conductor layer preferably of 1 atomic percent and more preferably 1 to 6 atomic percent, the meritorious effect of the present invention may be displayed satisfactorily. It is thought that similar meritorious effects may also be achieved with the amount of Ag of up to 10 atomic percent in the conductor layer.

Meritorious Effect of the Invention

Since a conductor layer constituting a coil of a thin film magnetic head of the present invention is substantially formed of a Cu—Ag alloy, a flat gap surface is produced. In addition, the thin film magnetic head exhibits excellent electro-magnetic conversion characteristics even after it is heat-treated at elevated temperatures.

Figure 1:
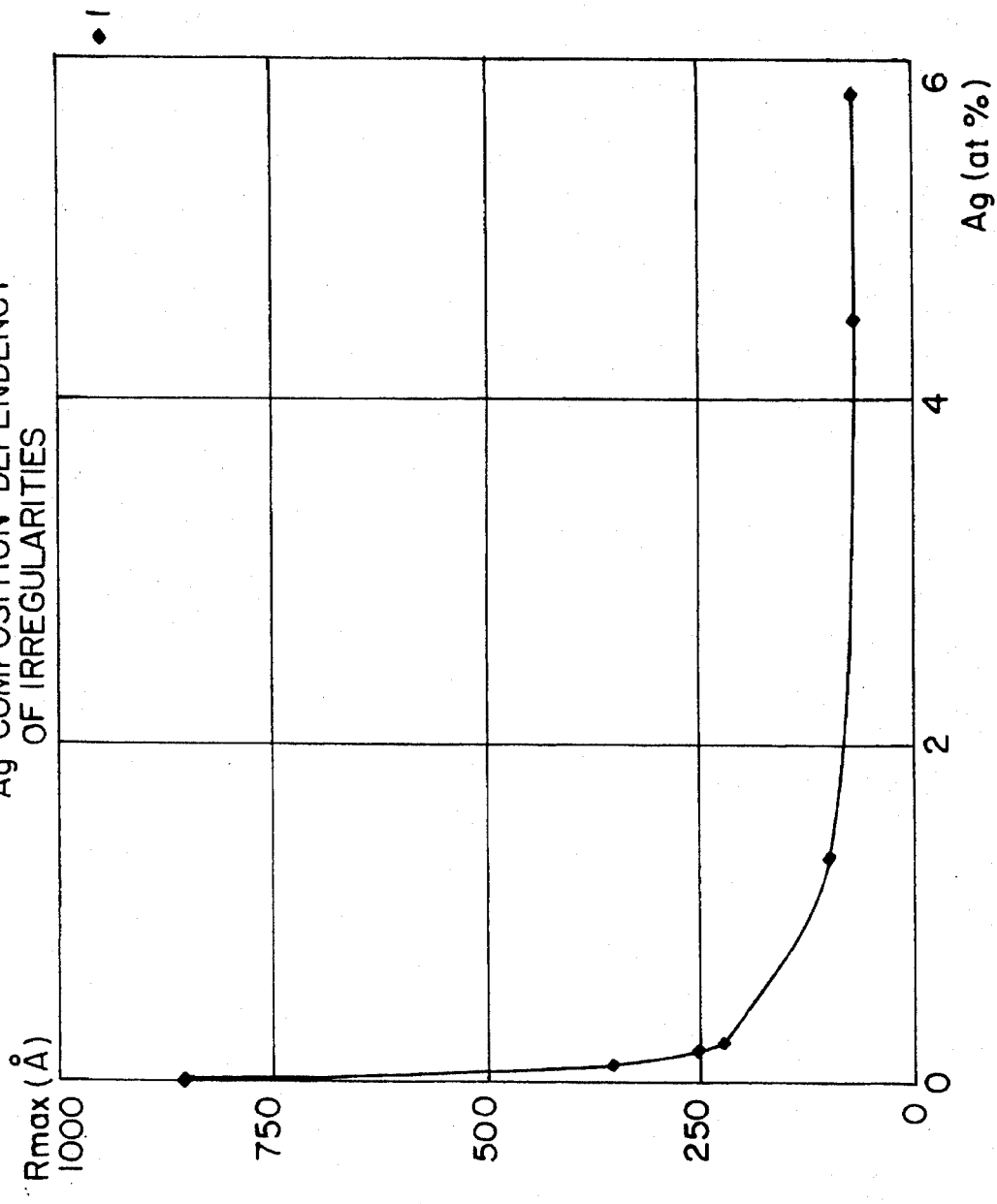
FIG. 1 is a graph showing the relation between the amount of Ag in the coil conductor layer and the level of surface irregularities on the surface of a $SiO_2$ layer following removal of the coil conductor layer by etching.
Figure 2:
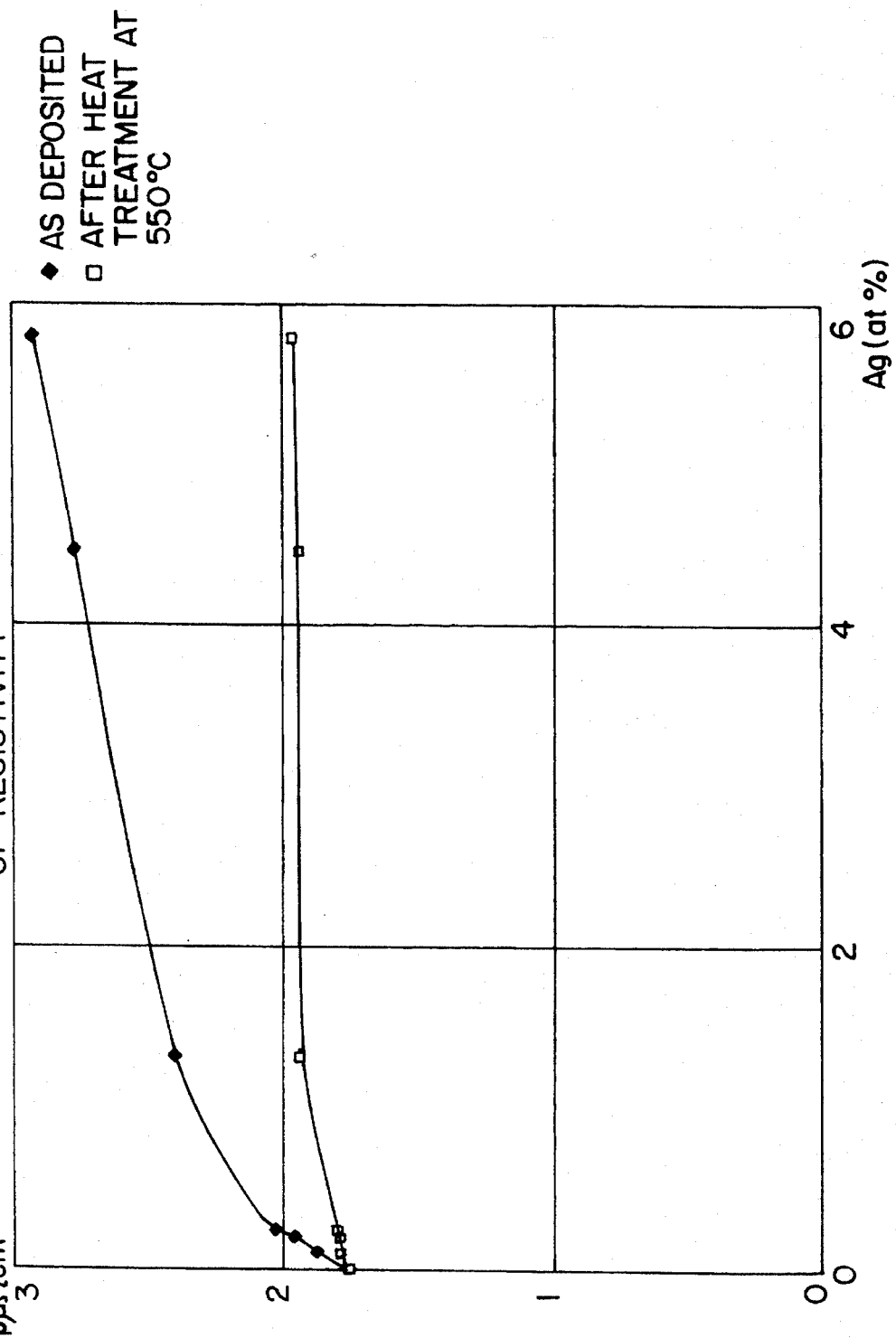
FIG. 2 is a graph showing the relation between the amount of Ag in the coil conductor layer and resistivity of the coil conductor layer.
Figure 3:
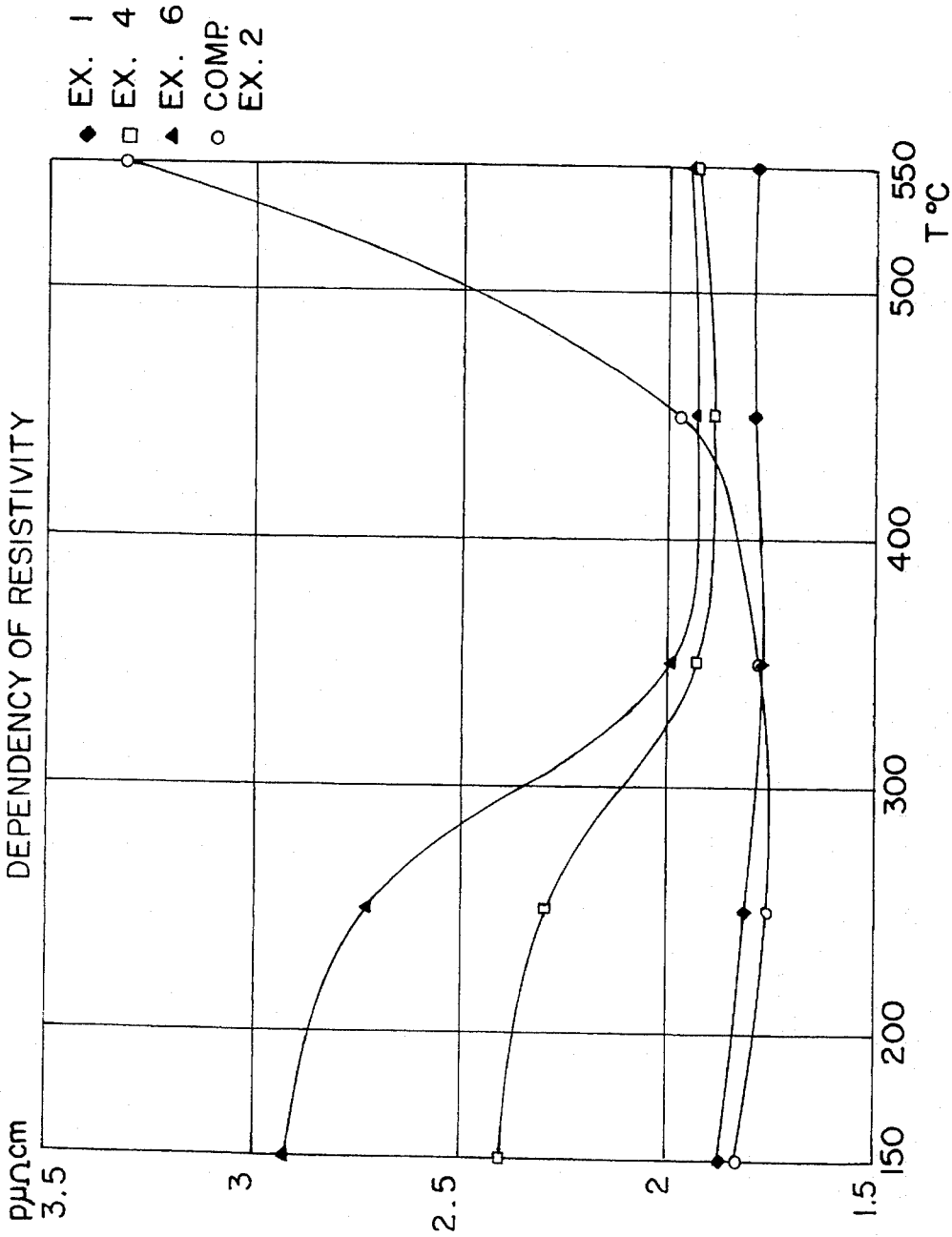
FIG. 3 is a graph showing the relation between the heat-treatment temperature of the coil conductor layer and resistivity of the coil conductor layer following heat treatment.
Figure 4:
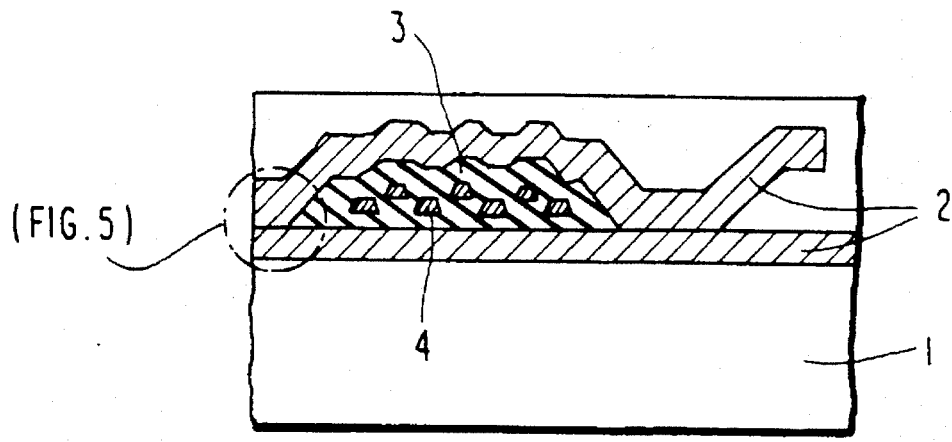
FIG. 4 is a cross-sectional view of a portion of a thin film magnetic head in accordance with a preferred embodiment of this invention, including substrate 1, magnetic layer 2, insulating layer 3 and coil conductor layer 4.
Figure 5:
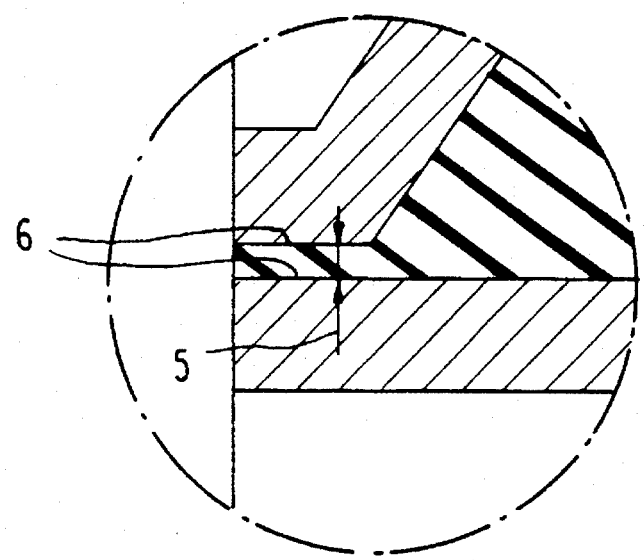
FIG. 5 is an enlarged cross-sectional view of FIG. 4, further showing gap 5 and gap surface 6.

In the following the present invention will be further disclosed in more detail with reference to the preferred embodiments.

EXAMPLES

Two sets of samples were produced, each sample set being formed of a plurality of samples each composed of a sapphire substrate on which $SiO_2$ is formed to a thickness of 2 μm on which a Cu—Ag alloy coil conductor layer having one of various compositions as shown in Table 1 is formed.

For film formation, a predetermined number of Ag chips, each 1 square centimeter in size, were placed on a Cu target of 8 inches in diameter, and processed by a RF magnetron sputtering at a cathode power of 1,000 W, a sputtering gas pressure of 0.2 Pa and a substrate temperature of 150° C.

Each sample of one of the sample sets was processed by etching for a predetermined time interval by ion milling at an acceleration voltage of 700 V and an incident angle of 0 degree about a normal line drawn to the sapphire substrate to remove the Cu—Ag alloy and expose the $SiO_2$ surface, and surface irregularities on the exposed surface which corresponds to a gap surface were measured with the aid of a needle contact probe type step level meter. Each sample of the remaining sample set was heat-treated at various temperatures and resistivity of the coil conductor layer thereof was measured at each of the heat-treatment temperatures. Finally, the samples were analyzed as to the compositions. The results are shown on Table 1.

COMPARATIVE EXAMPLES

A sample was formed in the same manner as in EXAMPLES above except that the coil conductor layer was free of Ag, that is, it was formed only of Cu and hence compositional analysis was unnecessary (Comparative Example 1). Similarly, a sample was formed in the same manner as in Comparative Example 1 above except that a Ti film of 0.05 μm thick was formed on each side of the Cu film under the same film forming conditions as those for the Cu film to provide a coil conductor layer (Comparative Example 2). These samples were measured as to surface irregularities following etching and as to resistivity of the coil conductor layer. The results are shown on Table 2.

With the sample of Comparative Example 1, surface irregularities become excessive although the resistivity remains stable up to a higher temperature. With the sample of Comparative Example 2, the resistivity is increased acutely when heat-treated at higher temperatures of not lower than 450° C. although the surface irregularities are fairly insignificant. In contrast thereto, fairly insignificant surface irregularities and low resistivity following heat treatment at elevated temperatures are produced with any of the samples of the EXAMPLES according to the present invention.

That is, according to the present invention, the resistivity of not more than about 2 μΩcm even after heat treatment at 450° C. to 550° C. is achieved in accordance with the improved level of surface irregularities (i.e., surface smoothness) which stands at most 350 Rmax Å at a minimum Ag concentration, preferably 100 Rmax Å or below at a Ag concentration of about 1 atomic percent or more up to about 6 atomic percent.

It should be noted that modifications may be done without departing from the gist and scope herein disclosed and claimed in the appended claims.

What is claimed is:

1. A method for producing a thin film magnetic head, comprising the steps of:
    (a) providing a substrate having thereon a magnetic layer, an insulating layer, and a gap layer, at least a portion of said gap layer defining a gap surface;
    (b) forming and patterning to a predetermined shape a conductor layer constituting a coil on said insulating layer by lithography and ion milling; and then
    (c) heat treating said substrate at a temperature of at least 450° C.
wherein said conductor layer consists essentially of Cu—Ag alloy, and said gap surface has a surface irregularity level of about 350 Angstroms or less $R_{max}$.

2. The method for producing a thin film magnetic head as defined in claim 1,
    wherein said conductor layer has a resistivity not exceeding 2 μΩcm after heat treatment at a temperature of at least 450° C.

3. The method for producing a thin film magnetic head as defined in claim 1,
    wherein said gap surface has a surface irregularity level of 100 Angstroms or less at $R_{max}$ after heat treatment at a temperature of at least 450° C.

4. The method for producing a thin film magnetic head as defined in claim 1,
    wherein said conductor layer has a compositional formula of $Cu_{100-x}Ag_x$ where $0.1 \leq x \leq 10$ in terms of atomic percent.

5. The method for producing a thin film magnetic head as defined in claim 1,
    wherein said conductor layer has a compositional formula of $Cu_{100-x}Ag_x$ where $1 \leq x \leq 6$ in terms of atomic percent.

* * * * *

TABLE 1

| Ex. No. | Number of Ag chips | Ag Composition at % | Resistivity ρ [μΩcm] | | | | | Level of irregularities RmaxÅ |
|---|---|---|---|---|---|---|---|---|
| | | | as dep. (not heat-treated) | 250° C. | 350° C. | 450° C. | 550° C. | |
| 1 | 1 | 0.10 | 1.87 | 1.81 | 1.77 | 1.79 | 1.79 | 350 |
| 2 | 2 | 0.20 | 1.95 | — | 1.83 | — | 1.79 | 250 |
| 3 | 4 | 0.24 | 2.02 | — | 1.88 | — | 1.80 | 220 |
| 4 | 5 | 1.32 | 2.40 | 2.29 | 1.93 | 1.89 | 1.93 | 100 |
| 5 | 9 | 4.46 | 2.77 | 2.59 | 1.98 | 1.92 | 1.93 | 70 |
| 6 | 21 | 5.79 | 2.92 | 2.72 | 1.99 | 1.93 | 1.95 | 70 |

TABLE 2

| Comp. Ex. No. | Resistivity ρ [μΩcm] | | | | | Level of irregularities RmaxÅ |
|---|---|---|---|---|---|---|
| | as dep. (not heat-treated) | 250° C. | 350° C. | 450° C. | 550° C. | |
| 1 | 1.82 | 1.77 | 1.74 | 1.76 | 1.76 | 850 |
| 2 | 1.83 | 1.76 | 1.78 | 1.97 | 3.31 | 100 |